United States Patent
Zeh et al.

(10) Patent No.: US 11,263,322 B2
(45) Date of Patent: Mar. 1, 2022

(54) SECURE X-MODULAR REDUNDANCY

(71) Applicant: Infineon Technologies AG, Neubiberg (DE)

(72) Inventors: Alexander Zeh, Munich (DE); Avni Bildhaiya, Deisenhofen bei München (DE)

(73) Assignee: Infineon Technologies AG

( * ) Notice: Subject to any disclaimer, the term of this patent is extended or adjusted under 35 U.S.C. 154(b) by 499 days.

(21) Appl. No.: 16/113,158

(22) Filed: Aug. 27, 2018

(65) Prior Publication Data

US 2020/0065486 A1    Feb. 27, 2020

(51) Int. Cl.
*G06F 21/56* (2013.01)
*G06F 21/55* (2013.01)

(52) U.S. Cl.
CPC ............ *G06F 21/56* (2013.01); *G06F 21/554* (2013.01)

(58) Field of Classification Search
CPC ............................... G06F 21/56; G06F 21/554
See application file for complete search history.

(56) References Cited

U.S. PATENT DOCUMENTS

| | | | |
|---|---|---|---|
| 2002/0011827 A1* | 1/2002 | Ishida | G01R 31/318342 324/71.5 |
| 2005/0210179 A1* | 9/2005 | Walmsley | B41J 2/04505 711/3 |
| 2018/0018216 A1* | 1/2018 | Halford | H04L 1/004 |
| 2018/0225564 A1* | 8/2018 | Haiut | G06N 3/0481 |
| 2019/0028263 A1* | 1/2019 | Avital | G06F 21/72 |
| 2019/0370019 A1* | 12/2019 | Tsirkin | G06F 21/52 |
| 2020/0028900 A1* | 1/2020 | Rice | H04L 69/40 |

* cited by examiner

*Primary Examiner* — Lynn D Feild
*Assistant Examiner* — Vladimir I Gavrilenko
(74) *Attorney, Agent, or Firm* — Design IP

(57) ABSTRACT

A redundancy system includes a first computational device and a second computational device each configured to receive at least one input and to generate a first output and a second output, respectively, based on the at least one input; a random sequence generator configured to generate a random bit sequence; a random delay selector configured to determine a random delay based on the random bit sequence; a first random delay circuit configured to delay outputting the at least one input to the first computational device based on the random delay; a second random delay circuit configured to delay outputting the second output based on the random delay; and a fault detection circuit configured to receive the first output and the delayed second output, and to generate a comparison result based on comparing the first input to the delayed second output.

23 Claims, 5 Drawing Sheets

SECURE X-MODULAR REDUNDANCY

FIELD

The present disclosure relates generally to secure redundancy systems and to methods for operating the same.

BACKGROUND

Functional safety of electronic systems in automotive passenger cars is an important topic in the light of increasing automation and semiconductor content of modern cars. It is desirable to have a reliable and safe functionality for the safety critical parts deployed in the system.

One requirement, which may often exist in such safety-critical applications, is that malfunctions of a sensor device have to be detectable by the system, for example by an entity receiving signals from the sensor device. In other words, according to such a requirement it has to be possible to detect, if a sensor device delivers erroneous values, e.g., due to a fault of the sensor device. One approach to ensure this is to provide redundancy, for example to provide two separate sensors for measuring the same physical quantity. Deviations between measurements of the two sensor devices above a threshold may indicate a malfunction of at least one of the two sensors provided.

In addition to functional safety, cybersecurity has become an important aspect in vehicle electronics systems. It is inevitable to include both functional safety and automotive cybersecurity from the beginning of an electronic product design. Functional safety has reached a level of maturity, but cybersecurity is relatively new. Security parts may soon be required to be both safe and secure. Currently, there exist methods to establish safety for security. However, there is a gap in security at the hardware level. It might be easy for an attacker to extract information via physical access or even remotely via software. Therefore, there exists potential to solve this gap in an efficient manner.

Therefore, an improved device having increased security with respect to potential attacks in a redundancy system may be desired.

SUMMARY

Embodiments relate to secure redundancy system and to methods for operating the same.

According to one or more embodiments, a safety-security system is provided. This safety-security system includes a first computational device configured to receive at least one input and to generate a first output based on the at least one input; a second computational device configured to receive the at least one input and to generate a second output based on the at least one input; a random sequence generator configured to generate a random bit sequence; a random delay selector configured to determine a random delay based on the random bit sequence; a first random delay circuit coupled to an input of the first computational device and configured to receive the at least one input and the random delay, and to delay outputting the at least one input to the first computational device based on the random delay; a second random delay circuit coupled to an output of the second computational device and configured to receive the second output and the random delay, and to delay outputting the second output based on the random delay; and a fault detection circuit configured to receive the first output and the delayed second output, and to generate a comparison result based on comparing the first input to the delayed second output.

According to one or more embodiments, another safety-security system is provided. This safety-security system includes a first computational device configured to receive at least one input and to generate a first output based on the at least one input; a second computational device configured to receive the at least one input and to generate a second output based on the at least one input; a random sequence generator configured to generate a random bit sequence; a first delay circuit coupled to an input of the first computational device and configured to receive the at least one input, and to delay outputting the at least one input to the first computational device based on a delay; a second random delay circuit coupled to an output of the second computational device and configured to receive the second output and to delay outputting the second output based on the delay; and a random output selector configured to receive the first output, the delayed second output, and the random bit sequence, and further configured to select a random output from among the first output and the delayed second output based on the random bit sequence, and to output the random output.

According to one or more embodiments, a method is provided. The method includes generating, by a first computational device, a first output based on at least one input; generating, by a second computational device, a second output based on the at least one input; generating a random bit sequence; selecting a random delay based on the random bit sequence; delaying the at least one input from being received at the first computational device based on the selected random delay; delaying the second output based on the selected random delay; and generating a comparison result based on comparing the first input to the delayed second output.

BRIEF DESCRIPTION OF THE DRAWINGS

Embodiments are described herein making reference to the appended drawings.

DETAILED DESCRIPTION

Figure 1:
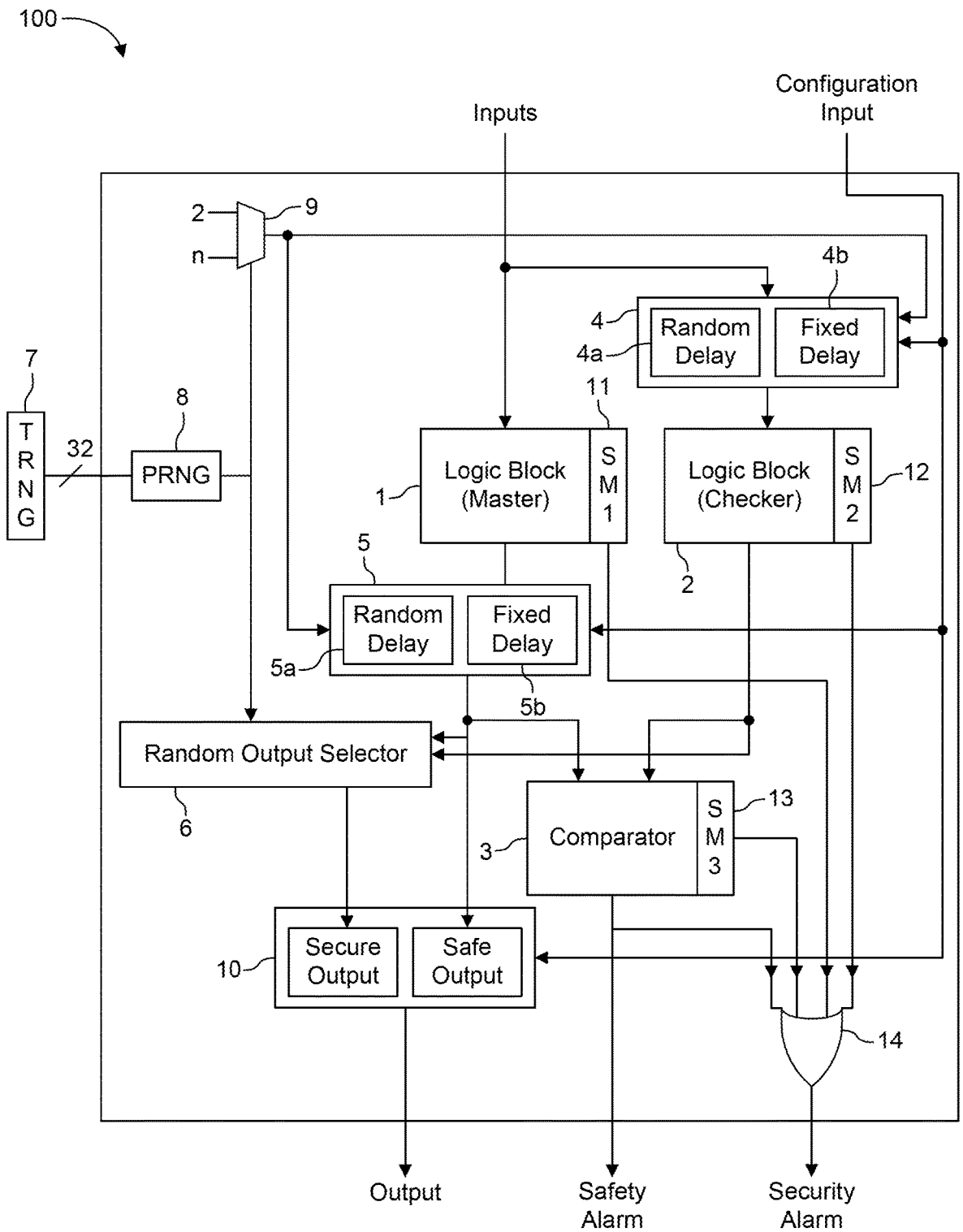
FIG. 1 is a schematic block diagram of a DMR system with safe and secure configurations according to one or more embodiments.

In the following, various embodiments will be described in detail referring to the attached drawings. It should be noted that these embodiments serve illustrative purposes only and are not to be construed as limiting. For example, while embodiments may be described as comprising a plurality of features or elements, this is not to be construed as indicating that all these features or elements are needed for implementing embodiments. Instead, in other embodiments, some of the features or elements may be omitted, or may be replaced by alternative features or elements. Additionally, further features or elements in addition to the ones explicitly shown and described may be provided, for example conventional components of sensor devices.

Features from different embodiments may be combined to form further embodiments, unless specifically noted otherwise. Variations or modifications described with respect to one of the embodiments may also be applicable to other embodiments.

Connections or couplings between elements shown in the drawings or described herein may be wire-based connections or wireless connections unless noted otherwise. Furthermore, such connections or couplings may be direct connections or couplings without additional intervening elements or indirect connections or couplings with one or more additional intervening elements, as long as the general purpose of the connection or coupling, for example to transmit a certain kind of signal or to transmit a certain kind of information, is essentially maintained.

It will be appreciated that the terms "microprocessors", "processors", "processor cores", "processing units", and "processing circuitry" may be used interchangeably throughout this disclosure. A logic block may include one or more processors and/or other logic circuitry configured to receive and process one or more inputs to generate an output. In particular, a logic block may be any computational device such as a processor, a central processing unit (CPU), a cryptographic engine, computing system, or the like.

It will be further appreciated that the concepts described herein are not limited to safety functions, and may be implemented in any device or system that uses fault/error detection.

Embodiments described herein provide secure functional safety, and, more particularly, provide secure x-modular redundancy, where x is an integer greater than one. Secure x-modular redundancy provides both functional safety (e.g., in the form of redundancy) and cybersecurity implemented to inhibit successful attacks (e.g., fault injection attacks) on the system.

A fault injection attack is a procedure to maliciously introduce an error in a computing device in order to alter the software execution. Two effects are mainly wanted with the fault injection: avoid the execution of an instruction and corrupt the data the processor is working with. These are often used to compromise the security of embedded devices by bypassing security checks or leaking the private cryptographic keys. For example, fault-injection attacks may allow an attacker to guess cryptographic keys based on the propagation of errors through the encryption/decryption algorithm.

In one type of attack, an attacker may inject an input into the system and look at the output to deduce some information about the behavior of the system. In addition, an attacker may introduce errors at specific chosen phases of a known cipher algorithm. Thus, the point of fault-injection is to study the effect of the injected fault on the cipher algorithm and to deduce some information about the value of the secret cryptographic key.

The secure x-modular redundancy set forth herein may be applied to automotive communication peripherals such as Controller Area Network (CAN), FlexRay, Ethernet, radar interfaces, other serial communication lines (e.g., SPI, LIN, SENT, and PSI5), optical communication protocols, or storage systems (e.g., embedded flash). Secure x-modular redundancy may integrate Dual Modular Redundancy (DMR) with additional security features, as described herein. While embodiments described herein may be directed to using DMR concepts, the same principles may be extended to systems that have a further level of redundancy (Triple Modular Redundancy (TMR), etc.). Thus, the embodiments should not be regarded as limited to a particular level of redundancy.

FIG. 1 is a schematic block diagram of a DMR system 100 with safe and secure configurations according to one or more embodiments. X-Modular Redundancy (XMR) is a technique that is used to detect faults in a system with high fault coverage. It is utilized in the electronics of both functional safety related applications and cybersecurity related applications. For example, DMR is used by embodiments described herein for error detection in case instruments or logic blocks that should give the same (identical) result give different results.

In the automotive context, DMR for functional safety works as a safety mechanism that enable high fault coverage for random hardware failures. It is more effective than implementing separate safety mechanisms for each case of a complex module. A CPU for example, could be implemented via lockstep safety mechanism to achieve an ASIL D level in functional safety which requires 99.9% diagnostic coverage.

In the automotive cybersecurity context, the basic fault model at hardware level remains the same. The difference to safety here is that these faults are not random anymore. A cryptographic algorithm can be broken and a key can be derived by maliciously introducing faults in the hardware implementation of the algorithm. Therefore, a lockstep mechanism helps to detect any maliciously introduced faults into cryptographic algorithms.

The DMR system 100 shown in FIG. 1 includes two processing cores, a master logic block 1 and a checker logic block 2 may be identical to each other in terms of hardware, firmware code, and/or algorithms and are arranged in a lockstep configuration. Alternatively, the firmware code and/or algorithms may be dissimilar but may provide the same nominal function such that the expected outputs of the two logic blocks are the same. Thus, in this case, the firmware codes/algorithms are mathematically equivalent but are implemented in a different, diverse manner such that the results of each calculation or function of each logic block can be compared to each other, and the results used for detecting a fault.

The two logic blocks 1, 2 are initialized to the same state during system start-up, and they receive the same inputs (e.g., code, bus operations and asynchronous events), so during normal operation the state of the two logic blocks 1, 2 are identical from clock to clock. They are said to be operating in lockstep. The lockstep technique assumes that an error in either logic block 1, 2 will cause a difference between the states of the two logic blocks 1, 2, which will eventually be manifested as a difference in the outputs, so the lockstep system monitors, for example, via a comparator 3, the outputs of the two logic blocks 1, 2 and flags an error in the case of a discrepancy.

Thus, a lockstep fault-tolerant system uses replicated elements that run the same set of operations in parallel. At any time, all the replications of each element should be in the same state. The same inputs are provided to each replication, and the same outputs are expected. The outputs of the replications are compared using a voting circuit or fault detection circuit (e.g., a comparator circuit). A system with two replications of each element is termed DMR. The voting circuit or fault detection circuit (e.g., comparator 3) can then detect a mismatch. A system with three replications of each element is termed TMR. The voting circuit can determine which replication is in error when a two-to-one vote is observed.

To run in lockstep, each logic block 1, 2 is arranged on a different processing thread and is set up to progress from one well-defined state to the next well-defined state. When a new set of inputs reaches the system 100, each logic block 1, 2 processes them, generates new outputs and updates its state. This set of changes (new inputs, new outputs, new state) is considered to define that step, and must be treated as an atomic transaction. In other words, either all of it happens, or none of it happens, but not something in between. Thus, the computing systems of the logic blocks are duplicated, but both actively process each step.

In addition, a time shift (delay) is used in each processing thread, which increases the detection probability of errors induced by external influences (e.g. voltage spikes, ionizing radiation, or in situ reverse engineering). Thus, the DMR system 100 includes two delay units 4 and 5. The delay units 4, 5 are respectively coupled to a corresponding one of the logic blocks 1, 2 in a staggered configuration. That is, delay unit 4 is coupled to the input of the checker logic block 2, and delay unit 5 is coupled to the output of the master logic block 1. This arrangement could also be reversed such that the delay unit 5 is coupled to the input of the master logic block 1, and the delay unit 4 is coupled to the output of the checker logic block 2. The staggered delays help to ensure independence from a same error or fault influencing both logic blocks 1, 2. Thus, common cause failures between logic blocks can be avoided using the staggered delays.

A delay unit 4, 5 may be any delay circuit configured to receive and hold an input for a predetermined number of clock cycles before outputting (i.e., forwarding) the input. As will be described in more detail below, each delay unit 4 and 5 includes a random delay circuit 4a and 5a, respectively, and a fixed delay circuit 4b and 5b, respectively. The use of either the random delay circuits 4a, 5a or the fixed delay circuits 4b, 5b is configured (i.e., selected) by a configuration input and the delay is defined by a number of clock cycles implemented by a delay counter. The delay generated by the fixed delay circuits 4b and 5b is hard configured and does not change throughout the device lifetime. The delay implemented by the random delay circuits 4a and 5a changes randomly for each set of inputs. Nevertheless, the delay generated by the delay units 4 and 5 are the same for each processing step (i.e., for each set of inputs).

The DMR system 100 receives an input or set of inputs from an overall system where the DMR system 100 is sub-system of the overall system. For example, the overall system may be a microcontroller (e.g., an automotive microcontroller) and the sub-system is part of the microcontroller. The inputs are received from the microcontroller. For example, inputs may be received from one or more memories or communication interfaces within the microcontroller. The inputs are used by master logic block 1 to perform a computation based on instructions stored in the master logic block 1. The checker logic block 2 receives the same inputs after a delay instituted by delay unit 4 and performs the same computation as the master logic block.

The outputs of the two logic blocks should be the same after the output of the master logic block 1 passes through and is delayed by the delay unit 5. The comparator 3 compares these outputs to determine whether the received outputs are the same or different. The comparator 3 may output a logic high signal (i.e., logic "1") if the outputs from the logic blocks fail (i.e., are different from each other). This "fail" signal may be referred to as a safety alarm. On the other hand, if the outputs from the logic blocks pass (i.e., are identical), the comparator 3 may output a logic low signal (i.e., logic "0"). The logic outputs of the comparator 3 used to indicate a pass or a fail may also be swapped according to design implementation.

Alternatively, the checker logic block 2 may implement an inverse computation relative to the computation performed by the master logic block 1, and the comparator 3 may generate a pass signal when the outputs of the logic blocks are different and a fail signal (i.e., a safety alarm) when the outputs of the logic blocks are identical.

In addition to the safety feature derived from the implemented redundancy and comparator 3, the DMR system 100 implements one or more additional security features: a random delay, a random output selector, and a configuration mode selector.

When a random delay is used, both random delay circuits 4a, 5a implement the same randomized delay based on a randomization signal. Thus, at any given point, the delay utilized by the delay units 4, 5 is the same. Implementing a random delay may require a higher amount of effort by an attacker to break the cryptographic algorithm (e.g., Advanced Encryption Standard (AES)), which is "lock-stepped". This provides safety and security for cryptography without the need for additional complex mechanisms.

A random output selector 6 also increases the efforts for an attacker but does not affect safety issues. In particular, the random output selector 6 is configured to selectively output one of the outputs received from logic blocks 1, 2 based on the randomization signal. By randomizing the output of the DMR system 100, an attacker may not be able to determine from which logic block 1 or 2 an output is being received, increasing the difficulty to hack the sub-system and preventing successful attacks.

Configuration mode selection via the configuration input enables flexibility to select between "safe-only", "secure-only", and "safe and secure" configurations (i.e., operation modes). Here, a user gets full flexibility on a choice of operational modes. The configuration input received by the DMR system 100 is used as a control signal to select between safety and security configurations.

The DMR system 100 further includes a True Random Number Generator (TRNG) 7, a Pseudo Random Number Generator (PRNG) PRNG 8, a random delay selector 9, and an output switch 10. The master logic block 1, the checker logic block 2, and the comparator 3 may each include their own respective safety mechanism, SM1, SM2, and SM3. The DMR system 100 may further include a security alarm output circuit 14 configured to receive one or more security alarms from the safety mechanisms SM1, SM2, and SM3 and the comparator 3, and output a security alarm if any security alarm is received from an "upstream" source.

The TRNG 7 and the PRNG 8 may, together, be referred to as a random sequence generator. The TRNG 7 is configured to generate a random number (e.g., a 32 bit seed value) that is used to initialize the PRNG 8. The PRNG 8 receives the seed value (i.e., the random number) from the TRNG 7 (e.g., a 32 bit value), the PRNG 8 produces a sequence of random bits and outputs the sequence of random bits as a randomization signal. In one example, the PRNG 8 may be a Linear Feedback Shift Register (LFSR). However, any type of PRNG may be used. The random delay selector 9 and the random output selector 6 receive the randomization signal from the PRNG 8.

The random delay selector 9 may be a multiplexer that defines a range of 2 to n clock cycles for the delay to be implemented by the random delay circuits 4a, 5a, where n in an integer greater than or equal to two. In particular, the random delay selector 9 is configured to decode the randomization signal and select one of the cycle delays (2 to n) based on some function to output to the random delay circuits 4a, 5a.

The function is used to determine an intended delay (i.e., the number of clock cycles to select from among 2 to n clock cycles). The function is programmed into random delay selector 9 and is used to determine the intended delay based on the LSFR output. The random delay circuits 4a, 5a are then configured to implement the cycle delay (2 to n) provided by the random delay selector 9 via a delay counter.

Thus, the random delay selector 9 selects a cycle delay based on the sequence of random bits. Since the value of the randomization signal is random, the implemented delay is also randomized. Also, since the sequence changes for each set of inputs, the random delay also changes for each set of inputs. Furthermore, since the function used to determine the selected delay is not known external to the DMR device (e.g., to an attacker), the function further prevents successful attacks.

The random delay selector 9 may also be incorporated into each of the delay units 4, 5 in a redundant manner, where each random delay selector 9 has the same number of selectable delay cycles (2 to n) and implements the same function used for decoding the sequence of random bits and selecting the delay.

The random output selector 6 also includes a decoder and may further include a multiplexer. The decoder may receive the output of the LSFR and decode the LSFR output based on some function to determine an intended output. The function is programmed into the decoder and is used to determine the intended output based on the LSFR output. The decoder may then provide a selection signal that corresponds to the intended output to the multiplexer. The multiplexer may then output (i.e., forward) one of the outputs received from the logic blocks based on a value of the selection signal (i.e., based on a logic "0" or "1"). Thus, the random output selector 6 may select either the output from the master logic block 1 or the output from the checker logic block 2 to output based on the sequence of random bits. Since the value of the randomization signal is random, the output selection is randomized. Furthermore, since the function is not known external to the DMR device (e.g., to an attacker), the function further prevents successful attacks.

The larger the value of n, the harder it would be for an attacker to be successful. Depending on the required security level this could be configurable to reach the required security level. However, the higher the delay, the slower the system will become.

The random sequence generator may be configured to generate one or more (e.g., two) sequences of random bits for each set of inputs. The above examples use one sequence of random bits for each set of inputs, but the random output selector 6 may receive a different sequence of random bits than the one received by the random delay circuits 4a, 5a.

For example, when generating two sequences of random bits, the TRNG 7 may generate two random numbers from which the PRNG 8 generates two sequences of random bits. These two sequences of random bits may be output from the PRNG 8 to a random bit sequence switch 15 that receives the two random bit sequences, and outputs a first random bit sequence to the random delay selector 9 (or directly to the delay units 4, 5), and outputs the other random bit sequence to the random output selector 6. The random bit sequence switch 15 may be a multiplexer. The random delay selector 9 and the random output selector 6 then apply their respective random bit sequence in a similar manner described above. In addition, the selection by the random bit sequence switch 15 as to which random bit sequence is sent to which downstream device may also be randomized for each set of inputs.

The output switch 10 may be configured based on the configuration input to selectively output either a safe output or a secure output. The safe output is the output received from the master logic block 1. The secure output is the output received from the random output selector 6. Thus, the secure output is either the output from the master logic block 1 or the output from the checker logic block 2, selected based on the randomization signal. The safe output may be used when the DMR system 100 is set in "safe-only" mode, whereas the secure output may be used when the DMR system 100 is set in "secure-only" mode or "safe and secure" mode.

As noted above, the master logic block 1, the checker logic block 2, and the comparator 3 may each include their own respective safety mechanism, SM1, SM2, and SM3. The DMR system 100 may further include a security alarm output circuit 14 configured to receive one or more security flags from the safety mechanisms SM1, SM2, and SM3 and the comparator 3, and output a security alarm if any security flag is received from an "upstream" source. For example, the security alarm output circuit 14 may be an OR gate that receives each of the four aforementioned inputs. However, the security alarm output circuit 14 may be comprised of any logic capable of receiving security flags from system components and generating a security alarm therefrom.

The DMR system 100 may output the security alarm from the security alarm output circuit 14 when the DMR system 100 is set in "secure-only" mode or "safe and secure" mode.

Each safety mechanism SM1, SM2, and SM3 is configured to detect a security event, such as an attack or a glitch, in a corresponding system component (i.e., the master logic block 1, the checker logic block 2, or the comparator 3). Upon detecting a security event, a safety mechanism will generate a security flag, such as a high output signal.

Safety mechanisms SM1 and SM2 may each include a set of redundant registers, safety flipflops, and/or error-correcting codes (e.g., for parity-prediction) that are used to detect a security event. Upon detecting a security event, the safety mechanism may generate a security flag and transmit the security flag to the security alarm output circuit 14.

Safety mechanism SM3 may include a set of redundant registers and/or may use a diverse comparison in which two sets of firmware codes/algorithms are implemented. These two sets of firmware codes/algorithms for performing the comparison of comparator 3 are mathematically equivalent but are implemented in a different, diverse manner such that the results of each comparison can be compared to each other, and the results used for detecting a security event. For example, if two diverse comparisons are performed, the comparison results should be identical. Otherwise, different comparison results indicate that there may be a security event. In this case, a security flag is generated and output by the safety mechanism SM3.

Figure 2:
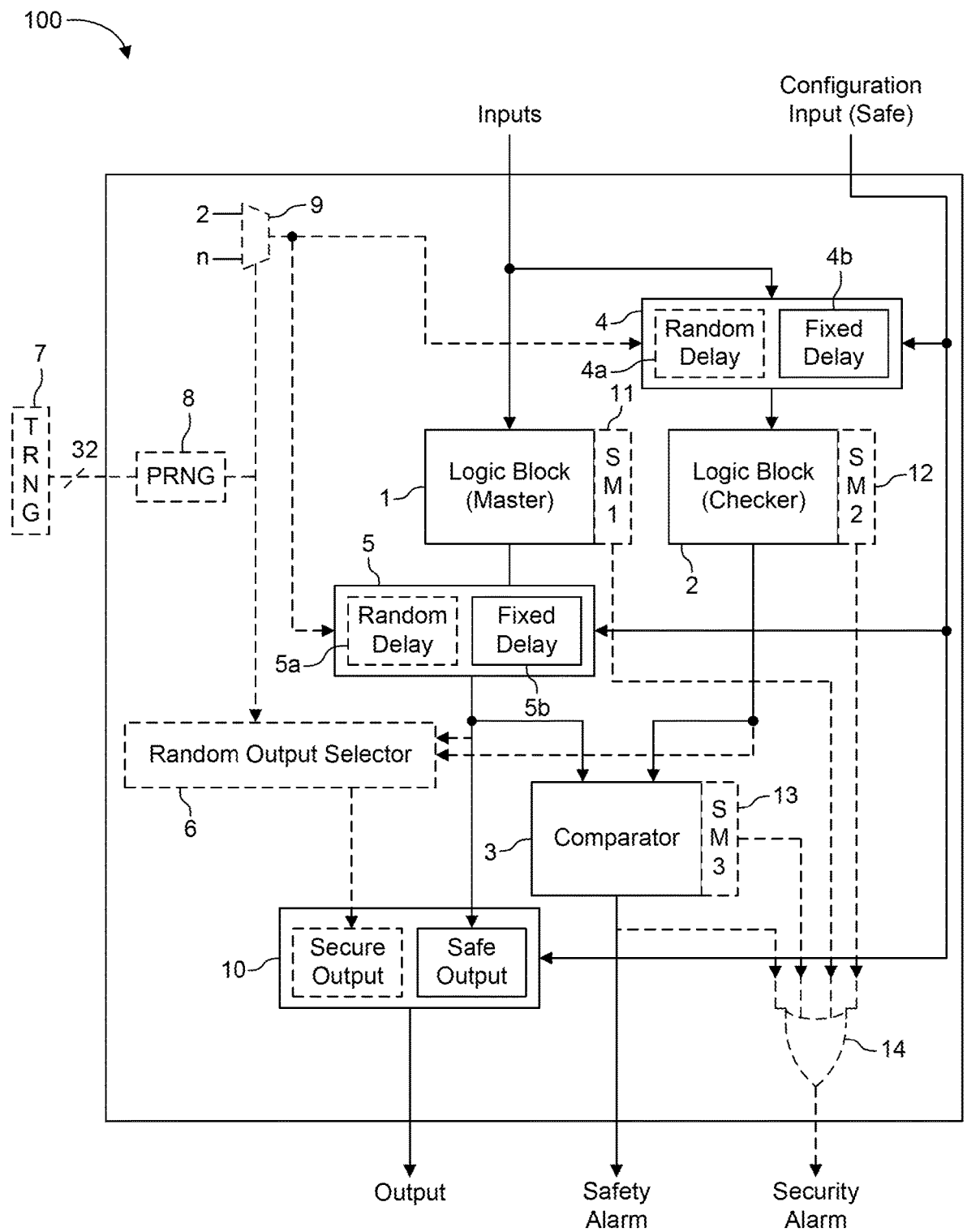
FIG. 2 is a schematic block diagram of the DMR system shown in FIG. 1 set in safe-only mode according to one or more embodiments.
Figure 3:
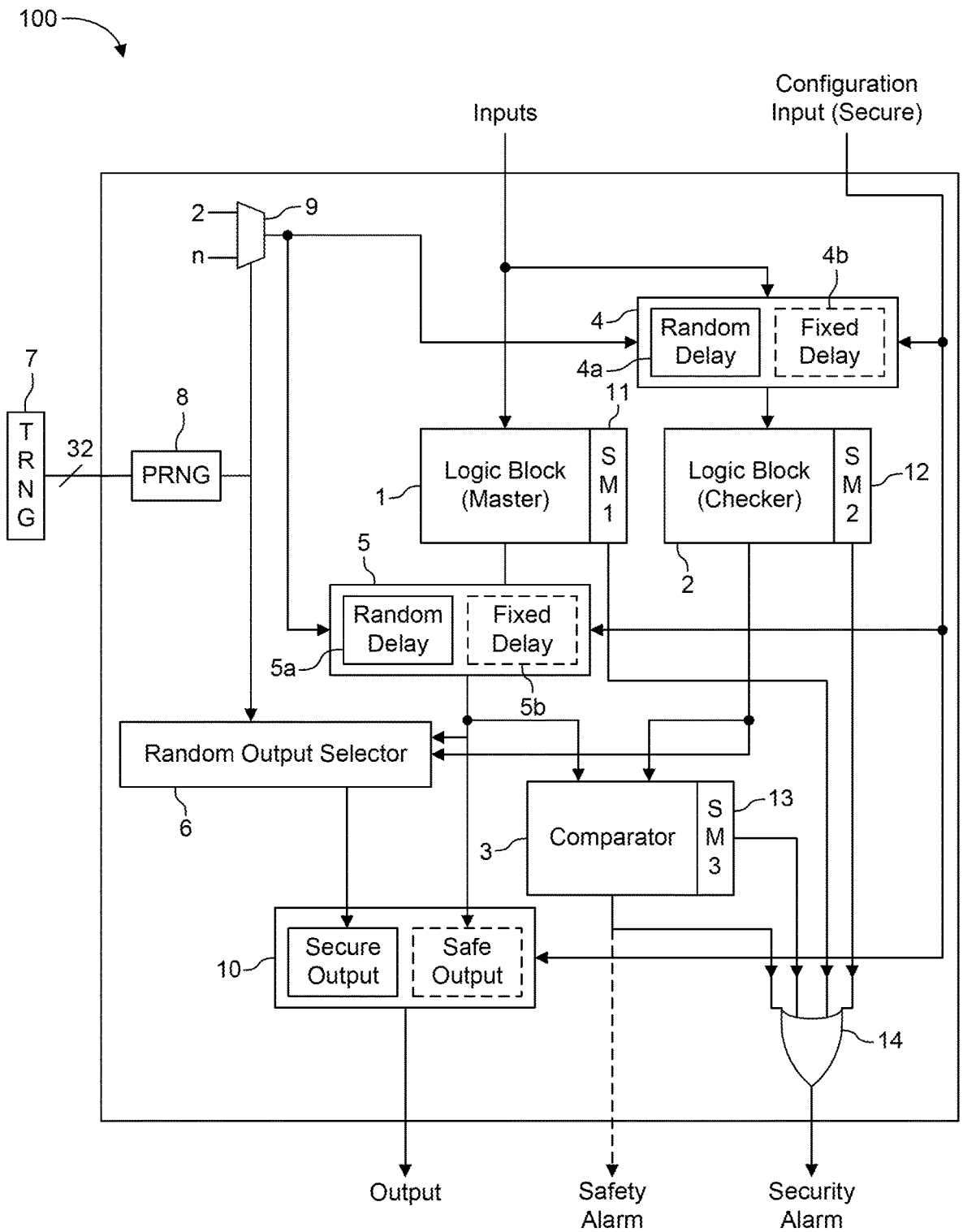
FIG. 3 is a schematic block diagram of the DMR system shown in FIG. 1 set in secure-only mode according to one or more embodiments.
Figure 4:
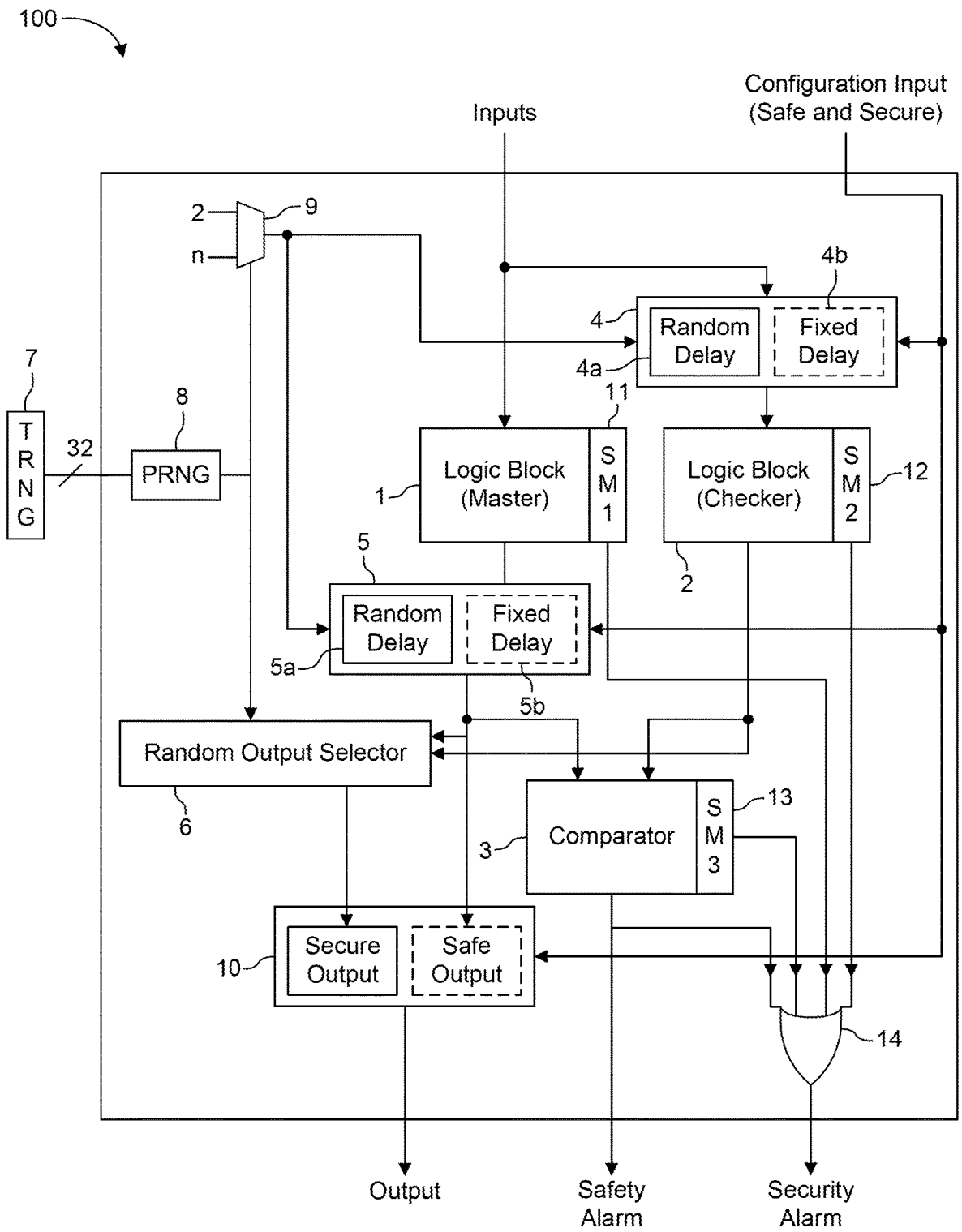
FIG. 4 is a schematic block diagram of the DMR system shown in FIG. 1 set in safe and secure mode according to one or more embodiments.

As will be demonstrated in FIGS. 2-4, different components may be used or activated based on the configuration mode selection via the configuration input. In particular, FIG. 2 shows an implementation of "safe-only" mode, FIG. 3 shows an implementation of "secure-only" mode, and FIG. 4 shows an implementation of a "safe and secure" mode according to one or more embodiments.

FIG. 2 is a schematic block diagram of the DMR system 100 shown in FIG. 1 set in safe-only mode according to one or more embodiments. Here, the random delay circuits 4a, 5b, the random output selector 6, TRNG 7, and the LSFR 8 are not used. Instead, the fixed delay circuits 4b, 5b based on a programmed delay counter, generate fixed delays. Specifically, components and signal paths represented by dotted lines are not utilized in this mode. Furthermore, the security alarm output circuit 14 will signal no security alarm. If the comparison fails at the comparator 3 a safety alarm is generated and output. In addition, the output switch 10 is configured to receive the safe output (i.e., the (delayed) output from the master logic block 1), and forward that output to the output of the DMR system 100.

FIG. 3 is a schematic block diagram of the DMR system 100 shown in FIG. 1 set in secure-only mode according to one or more embodiments. Components and signal paths represented by dotted lines, as illustrated, are not utilized in this mode. Here, the delay of the master and the checker logic blocks is chosen randomly and security alarms from the security alarm output circuit 14 are output by the DMR system 100. Thus, no safety alarm is signaled by the DMR system 100 in this mode. In addition, the output switch 10 is configured to receive the secure output (i.e., the output from the random output selector 6), and forward that output to the output of the DMR system 100.

FIG. 4 is a schematic block diagram of the DMR system 100 shown in FIG. 1 set in safe and secure mode according to one or more embodiments. Components and signal paths represented by dotted lines, as illustrated, are not utilized in this mode. If the comparison fails at the comparator 3 a safety alarm is output in addition to the security alarms from the security alarm output circuit 14. In addition, the output switch 10 is configured to receive the secure output (i.e., the output from the random output selector 6), and forward that output to the output of the DMR system 100.

Figure 5:
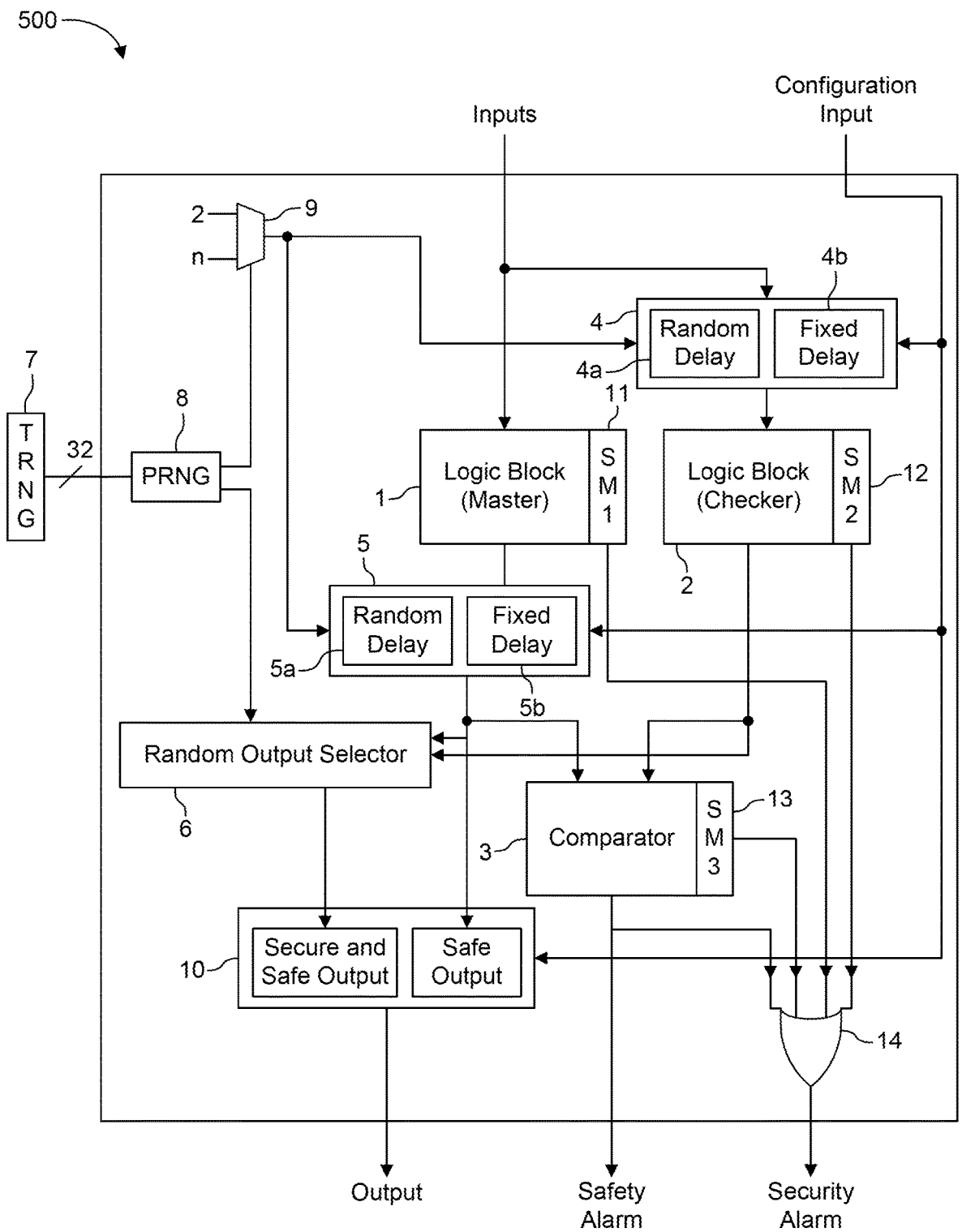
FIG. 5 is a schematic block diagram of a DMR system with safe and secure configurations according to one or more embodiments.

FIG. 5 is a schematic block diagram of a DMR system 500 with safe and secure configurations according to one or more embodiments. The DMR system 500 is similar to that of DMR system 100, except the PRNG 8 may include two separate outputs to the random output selector 6 and the random delay selector 9 (or to the random delay circuits 4a, 5a) so that the random output selector 6 and the random delay selector 9 may receive the same or different random bit sequences from the PRNG 8. Thus, the random sequence generator may be configured to generate one or more (e.g., two) sequences of random bits for each set of inputs.

If the random output selector 6 and the random delay selector 9 are to receive the same random bit sequence, then the PRNG 8 is initialized by the seed value provided by the TRNG 7 and generates a single random bit sequence as described above in reference to FIG. 1.

If a the random sequence generator generates different outputs (i.e., different random bit sequences), a few options are available.

In one example, the PRNG 8 may be initialized with one seed value provided by the TRNG 7, and may generate different outputs to the random output selector 6 and the random delay selector 9 (or to the random delay circuits 4a, 5a) via their respective circuit paths. The random output selector 6 and the random delay selector 9 may then receive their respective random bit sequence and proceed as similarly described above in reference to FIG. 1. This also applies to the random delay circuits 4a, 5a if they directly receive a random bit sequence from the PRNG 8.

In another example, a second PRNG (not shown) may be provided such that a first PRNG and a second PRNG are separately coupled to the random output selector 6 and the random delay selector 9, respectively. Here, each PRNG may receive a different seed value (i.e., a different random number) from the TRNG 7 and generate their own random bit sequence independent from the other random bit sequence. The random output selector 6 and the random delay selector 9 may then receive their respective random bit sequence and proceed as similarly described above in reference to FIG. 1. This also applies to the random delay circuits 4a, 5a if they directly receive a random bit sequence from the first or the second PRNG.

It will also be appreciated that the DMR system 500 may similarly incorporate the different configuration modes described in conjunction with FIGS. 2-4, with the PRNG 8 or PRNGs being active as similarly described in reference to those figures.

In view of the above, embodiments provide safety via redundancy/diversity and increased security against fault/glitching attacks via random delay and random output switch. Furthermore, configuration mode selection enables flexibility to select between "safe-only", "secure-only", and "safe and secure" configurations (i.e., operation modes).

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, such an apparatus may execute some one or more of the method steps.

With regard to the various functions performed by the components or structures described above (assemblies, devices, circuits, systems, etc.), the terms (including a reference to a "means") used to describe such components are intended to correspond, unless otherwise indicated, to any component or structure that performs the specified function of the described component (i.e., that is functionally equivalent), even if not structurally equivalent to the disclosed structure that performs the function in the exemplary implementations of the invention illustrated herein.

The above-described exemplary embodiments are merely illustrative. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

What is claimed is:

1. A safety-security system, comprising:
a first computational device configured to receive at least one input and to generate a first output based on the at least one input, wherein the first computational device is configured to generate the first output by performing a first computation that converts the at least one input to the first output, where the first computation is based on a first set of instructions defined by first firmware stored on the first computational device;
a second computational device configured to receive the at least one input and to generate a second output based on the at least one input, the second computational device is configured to generate the second output by performing a second computation that converts the at least one input to the second output, where the second computation is based on a second set of instructions defined by second firmware stored on the second computational device;

a random sequence generator configured to generate a random bit sequence;

a random delay selector configured to determine a random delay based on the random bit sequence;

a first random delay circuit coupled to an input of the first computational device and configured to receive the at least one input and the random delay, and to delay outputting the at least one input to the first computational device based on the random delay;

a second random delay circuit coupled to an output of the second computational device and configured to receive the second output and the random delay, and to delay outputting the second output based on the random delay; and a fault detection circuit configured to receive the first output and the delayed second output, and to generate a comparison result based on comparing the first output to the delayed second output.

2. The safety-security system of claim 1, further comprising:

a random output selector configured to receive the first output, the delayed second output, and the random bit sequence, and further configured to select a random output from among the first output and the delayed second output based on the random bit sequence, and to output the random output.

3. The safety-security system of claim 2, wherein one of the first output and the second output is a master output, and the fault detection system further comprises:

an output switch configured to receive a configuration signal and selectively output the random output from the random output selector or the master output as a system output based on the configuration signal.

4. The safety-security system of claim 1, wherein:

the random sequence generator is configured to generate a further random bit sequence, and the random output selector is configured to receive the first output, the delayed second output, and the further random bit sequence, and is further configured to select a random output from among the first output and the delayed second output based on the further random bit sequence, and to output the random output.

5. The safety-security system of claim 1, further comprising:

a first fixed delay circuit coupled to the input of the first computational device and preconfigured with a fixed delay, the first fixed delay circuit being configured to receive the at least one input, and to delay outputting the at least one input to the first computational device based on the fixed delay;

a second fixed delay circuit coupled to an output of the second computational device and preconfigured with the fixed delay, the second fixed delay circuit being configured to receive the second output, and to delay outputting the second output based on the fixed delay.

6. The safety-security system of claim 5, further comprising:

a first delay circuit comprising the first random delay circuit and the first fixed delay circuit, and configured to receive a configuration signal and to activate a first one of the first random delay circuit and the first fixed delay circuit and to deactivate a second one of the first random delay circuit and the first fixed delay circuit based on the configuration signal; and a second delay circuit comprising the second random delay circuit and the second fixed delay circuit, and configured to receive the configuration signal and to activate a first one of the second random delay circuit and the second fixed delay circuit and to deactivate a second one of the second random delay circuit and the second fixed delay circuit based on the configuration signal.

7. The safety-security system of claim 1, wherein the random sequence generator comprises:

a True Random Number Generator (TRNG) configured to generate a random number; and a Pseudo Random Number Generator (PRNG) configured to receive the random number from the TRNG and generate the random bit sequence.

8. The safety-security system of claim 1, wherein the random delay selector is configured to select the random delay from a plurality of delay cycles based on the random bit sequence.

9. The safety-security system of claim 1, wherein:

the fault detection circuit is configured to output the comparison result as a security alarm on a condition that the first input and the delayed second output are not the same.

10. The safety-security system of claim 1, wherein the fault detection system is configured to receive a configuration signal and selectively output the comparison result based on the configuration signal.

11. The safety-security system of claim 1, wherein:

the first computational device comprises a first safety-security mechanism configured to detect a first security event at the first computational device and to generate a first security flag based on detecting the first security event;

the second computational device comprises a second safety-security mechanism configured to detect a second security event at the second computational device and to generate a second security flag based on detecting the second security event; and the fault detection circuit comprises a third safety-security mechanism configured to detect a third security event at the fault detection circuit and to generate a third security flag based on detecting the third security event.

12. The safety-security system of claim 11, further comprising:

security alarm output circuit coupled to the first safety-security mechanism, the second safety-security mechanism, and the third safety-security mechanism, and configured to generate a security alarm on a condition that at least one of the first security flag, the second security flag, and the third security flag is received.

13. The safety-security system of claim 12, wherein the security alarm output circuit is configured to be selectively enabled or disabled based on a configuration signal.

14. A safety-security system, comprising:

a first computational device configured to receive at least one input and to generate a first output based on the at least one input, wherein the first computational device is configured to generate the first output by performing a first computation that converts the at least one input to the first output, where the first computation is based on a first set of instructions defined by first firmware stored on the first computational device;

a second computational device configured to receive the at least one input and to generate a second output based on the at least one input, the second computational device is configured to generate the second output by performing a second computation that converts the at least one input to the second output, where the second computation is based on a second set of instructions defined by second firmware stored on the second computational device;

a random sequence generator configured to generate a random bit sequence;

a first delay circuit coupled to an input of the first computational device and configured to receive the at least one input, and to delay outputting the at least one input to the first computational device based on a delay;

a second random delay circuit coupled to an output of the second computational device and configured to receive the second output and to delay outputting the second output based on the delay;

a random output selector configured to receive the first output, the delayed second output, and the random bit sequence, and further configured to select a random output from among the first output and the delayed second output based on the random bit sequence, and to output the random output; and a fault detection circuit configured to receive the first output and the delayed second output, and to generate a comparison result based on comparing the first output to the delayed second output.

15. The safety-security system of claim 14, further comprising:

a random delay selector configured to determine a random delay based on the random bit sequence, wherein the first delay circuit includes a first random delay circuit configured to receive the at least one input, and to delay outputting the at least one input to the first computational device based on the random delay that is used as the delay, and wherein the second delay circuit includes a second random delay circuit configured to receive the second output, and to delay outputting the second output to the random output selector based on the random delay that is used as the delay.

16. The safety-security system of claim 14, wherein:

the random sequence generator is configured to generate a further random bit sequence, and the safety-security system further comprises:

a random delay selector configured to determine a random delay based on the further random bit sequence, wherein the first delay circuit includes a first random delay circuit configured to receive the at least one input, and to delay outputting the at least one input to the first computational device based on the random delay that is used as the delay, and wherein the second delay circuit includes a second random delay circuit configured to receive the second output, and to delay outputting the second output to the random output selector based on the random delay that is used as the delay.

17. The safety-security system of claim 14, wherein:

the first delay circuit includes a first random delay circuit configured to determine a random delay based on the random bit sequence, to receive the at least one input, and to delay outputting the at least one input to the first computational device based on the random delay that is used as the delay, and the second delay circuit includes a second random delay circuit configured to determine the random delay based on the random bit sequence, to receive the second output, and to delay outputting the second output to the random output selector based on the random delay that is used as the delay.

18. The safety-security system of claim 14, wherein one of the first output and the second output is a master output, and the fault detection system further comprises:

an output switch configured to receive a configuration signal and selectively output the random output from the random output selector or the master output as a system output based on the configuration signal.

19. A method, comprising:

generating, by a first computational device, a first output based on at least one input by performing a first computation that converts the at least one input to the first output, where the first computation is based on a first set of instructions defined by first firmware stored on the first computational device;

generating, by a second computational device, a second output based on the at least one input by performing a second computation that converts the at least one input to the second output, where the second computation is based on a second set of instructions defined by second firmware stored on the second computational device;

generating, by a random sequence generator, a random bit sequence;

selecting, by a random delay selector, a random delay based on the random bit sequence;

delaying, by a first random delay circuit, the at least one input from being received at the first computational device based on the selected random delay;

delaying, by a second random delay circuit, the second output based on the selected random delay; and generating, by a fault detection circuit, a comparison result based on comparing the first input to the delayed second output.

20. The method of claim 19, further comprising:

selecting a random output from among the first output and the delayed second output based on the random bit sequence, and outputting the random output.

21. The safety-security system of claim 1, wherein the first computational device and the second computational device are configured to generate the first output and the second output, respectively, based on the same one or more inputs.

22. The safety-security system of claim 1, wherein the at least one input is a set of inputs.

23. The safety-security system of claim 1, wherein the first computational device is a first processing core and the second computational device is a second processing core.

* * * * *